(12) United States Patent
Priest et al.

(10) Patent No.: US 9,669,945 B2
(45) Date of Patent: *Jun. 6, 2017

(54) TETHERED UNMANNED AERIAL VEHICLE-BASED SYSTEMS AND METHODS ASSOCIATED WITH CELL SITES AND CELL TOWERS

(71) Applicants: Lee Priest, Charlotte, NC (US); Charlie Terry, Charlotte, NC (US); Ross Erickson, Charlotte, NC (US)

(72) Inventors: Lee Priest, Charlotte, NC (US); Charlie Terry, Charlotte, NC (US); Ross Erickson, Charlotte, NC (US)

(73) Assignee: ETAK SYSTEMS, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,925

(22) Filed: Jun. 11, 2015

(65) Prior Publication Data

US 2016/0309341 A1 Oct. 20, 2016

Related U.S. Application Data

(63) Continuation-in-part of application No. 14/685,720, filed on Apr. 14, 2015.

(51) Int. Cl.
*H04W 24/02* (2009.01)
*B64D 47/08* (2006.01)
(Continued)

(52) U.S. Cl.
CPC .............. *B64D 47/08* (2013.01); *B64C 27/06* (2013.01); *B64C 39/022* (2013.01);
(Continued)

(58) Field of Classification Search
None
See application file for complete search history.

(56) References Cited

U.S. PATENT DOCUMENTS 8,346,578 B1 1/2013 Hopkins et al.
9,439,092 B1 * 9/2016 Chukka ................. H04W 24/08
(Continued)

OTHER PUBLICATIONS

Knutson et al., "In Race for Better Cell Service, Men Who Climb Towers Pay With Their Lives," PBS.org, pp. 1-12.
(Continued)

*Primary Examiner* — Kimberly A Williams
(74) *Attorney, Agent, or Firm* — Clements Bernard Walker PLLC; Lawrence A. Baratta, Jr.; Christopher L. Bernard

(57) ABSTRACT

A method with a tethered Unmanned Aerial Vehicle (UAV) associated with a cell site includes causing the UAV to fly at or near the cell site while the UAV is tethered at or near the cell site via a connection, wherein flight of the UAV at or near the cell site is constrained based on the connection; and performing one or more functions via the UAV at the cell site while the UAV is flying tethered at or near the cell site. The one or more functions can include functions related to a cell site audit. Alternatively, the one or more functions include functions related to providing wireless service via the UAV at the cell site, wherein data and/or power is transferred between the UAV and the cell site to perform the wireless service.

16 Claims, 9 Drawing Sheets

(51) Int. Cl.
*G05D 1/00* (2006.01)
*G05D 1/10* (2006.01)
*B64C 39/02* (2006.01)
*B64C 27/06* (2006.01)
*G05D 1/08* (2006.01)

(52) U.S. Cl.
CPC ......... *B64C 39/024* (2013.01); *G05D 1/0094* (2013.01); *G05D 1/0866* (2013.01); *B64C 2201/201* (2013.01)

(56) References Cited

U.S. PATENT DOCUMENTS

| | | | |
|---|---|---|---|
| 2010/0215212 A1* | 8/2010 | Flakes, Jr. | G01M 5/0025 382/100 |
| 2010/0231687 A1* | 9/2010 | Amory | H04N 5/23238 348/36 |
| 2011/0221692 A1 | 9/2011 | Seydoux et al. | |
| 2012/0250010 A1 | 10/2012 | Hannay | |
| 2013/0173088 A1 | 7/2013 | Callou et al. | |
| 2013/0233964 A1* | 9/2013 | Woodworth | B64C 37/02 244/2 |
| 2013/0325217 A1 | 12/2013 | Seydoux et al. | |
| 2014/0018976 A1 | 1/2014 | Goossen et al. | |
| 2014/0131510 A1* | 5/2014 | Wang | B64C 39/024 244/17.23 |
| 2014/0277854 A1* | 9/2014 | Jones | G05D 1/102 701/3 |
| 2014/0298181 A1 | 10/2014 | Rezvan | |
| 2015/0304869 A1* | 10/2015 | Johnson | H04W 24/08 701/2 |
| 2016/0083115 A1* | 3/2016 | Hess | B64F 3/02 701/3 |

OTHER PUBLICATIONS

Knutson et al., "Methodology: How We Calculated the Tower Industry Death Rate," ProPublica, pp. 1-2.

* cited by examiner

TETHERED UNMANNED AERIAL VEHICLE-BASED SYSTEMS AND METHODS ASSOCIATED WITH CELL SITES AND CELL TOWERS

CROSS-REFERENCE TO RELATED APPLICATION(S)

The present patent/application is a continuation-in-part of U.S. patent application Ser. No. 14/685,720 filed Apr. 14, 2015 and entitled "UNMANNED AERIAL VEHICLE-BASED SYSTEMS AND METHODS ASSOCIATED WITH CELL SITES AND CELL TOWERS," the contents of which are incorporated by reference herein.

FIELD OF THE DISCLOSURE

The present disclosure relates generally to cell site systems and methods. More particularly, the present disclosure relates to tethered unmanned aerial vehicle (UAV)-based systems and methods associated with cell sites and cell towers, such as assisting in cell site audits.

BACKGROUND OF THE DISCLOSURE

Due to the geographic coverage nature of wireless service, there are hundreds of thousands of cell towers in the United States. For example, in 2014, it was estimated that there were more than 310,000 cell towers in the United States. Cell towers can have heights up to 1,500 feet or more. There are various requirements for cell site workers (also referred to as tower climbers or transmission tower workers) to climb cell towers to perform maintenance, audit, and repair work for cellular phone and other wireless communications companies. This is both a dangerous and costly endeavor. For example, between 2003 and 2011, 50 tower climbers died working on cell sites (see, e.g., www.pbs.org/wgbh/pages/frontline/social-issues/cell-tower-deaths/in-race-for-better-cell-service-men-who-climb-towers-pay-with-their-lives/). Also, OSHA estimates that working on cell sites is 10 times more dangerous than construction work, generally (see, e.g., www.propublica.org/article/cell-tower-work-fatalities-methodology. Furthermore, the tower climbs also can lead to service disruptions caused by accidents. Thus, there is a strong desire, from both a cost and safety perspective, to reduce the number of tower climbs.

Concurrently, the use of unmanned aerial vehicles (UAV), referred to as drones, is evolving. There are limitations associated with UAVs, including emerging FAA rules and guidelines associated with their commercial use. It would be advantageous to leverage the use of UAVs to reduce tower climbs of cell towers. US 20140298181 to Rezvan describes methods and systems for performing a cell site audit remotely. However, Rezvan does not contemplate performing any activity locally at the cell site, nor various aspects of UAV use. US 20120250010 to Hannay describes aerial inspections of transmission lines using drones. However, Hannay does not contemplate performing any activity locally at the cell site, nor various aspects of constraining the UAV use. Specifically, Hannay contemplates a flight path in three dimensions along a transmission line.

BRIEF SUMMARY OF THE DISCLOSURE

In an exemplary embodiment, a method with a tethered Unmanned Aerial Vehicle (UAV) associated with a cell site includes causing the UAV to fly at or near the cell site while the UAV is tethered at or near the cell site via a connection, wherein flight of the UAV at or near the cell site is constrained based on the connection; and performing one or more functions via the UAV at or near the cell site while the UAV is flying tethered at or near the cell site. The method can further include transferring power and/or data to and from the UAV via the connection. The connection can include one or more of a cable, a rope, a power cable, a communications cable, and a fiber optic cable. The one or more functions can include functions related to a cell site audit. The one or more functions can include functions related to providing wireless service via the UAV at or near the cell site, wherein data and/or power is transferred via the connection perform the wireless service. The method can further include storing the UAV at the cell site in a housing while the UAV is not in use. The UAV can be configured to fly extended periods at or near the cell site utilizing power from the connection. The connection can be configured to constrain a flight path of the UAV at or near the cell site. The one or more functions can include providing visual air traffic control via one or more cameras on the UAV. The connection can be tethered to a connection point including any of a stake, a pole, a weight, a fence, a communications device, a wireless radio, a building or other structure at or near the cell site, and a component associated with a cell tower at the cell site.

In another exemplary embodiment, a tethered Unmanned Aerial Vehicle (UAV) associated with a cell site includes one or more rotors disposed to a body, wherein the body is tethered to the cell site via a connection; a camera associated with the body; wireless interfaces; a processor coupled to the wireless interfaces and the camera; and memory storing instructions that, when executed, cause the processor to: process commands to cause the one or more rotors to fly the UAV at or near the cell site while the UAV is tethered at or near the cell site via the connection, wherein flight of the UAV at or near the cell site is constrained based on the connection; and perform one or more functions via the UAV at or near the cell site while the UAV is flying tethered at or near the cell site, utilizing one or more of the camera and the wireless interfaces. Power and/or data can be transferred to and from the UAV via the connection. The connection can include one or more of a cable, a rope, a power cable, a communications cable, and a fiber optic cable. The one or more functions can include functions related to a cell site audit. The one or more functions can include functions related to providing wireless service via the UAV at or near the cell site, wherein data and/or power is transferred via the connection to perform the wireless service. The UAV can be stored at or near the cell site in a housing while the UAV is not in use. The UAV can be configured to fly extended periods at or near the cell site utilizing power from the connection. The connection can be configured to constrain a flight path of the UAV at or near the cell site. The UAV can be tethered to a connection point including any of a component associated with a cell tower at the cell site, a stake, a pole, a weight, a fence, a communications device, a wireless radio, and a building or other structure at or near the cell site In another exemplary embodiment, a cell site includes a cell tower with cell site components associated therewith; a housing at the cell site storing an Unmanned Aerial Vehicle (UAV), wherein the UAV is tethered at the cell site via a connection; wherein the UAV is configured to fly at or near the cell site responsive to a command while the UAV is tethered at or near the cell site via the connection, wherein flight of the UAV at or near the cell site is constrained based on the connection; and wherein the UAV is configured to perform one or more functions at or near the cell site while the UAV is flying tethered at or near the cell site, utilizing one or more of a camera and wireless interfaces.

In an exemplary embodiment, a method performed at a cell site with an Unmanned Aerial Vehicle (UAV) communicatively coupled to a controller to perform a cell site audit, without requiring a tower climb at the cell site, includes causing the UAV to fly substantially vertically up to cell site components using the controller, wherein flight of the UAV is constrained in a three-dimensional rectangle at the cell site; collecting data associated with the cell site components using the UAV; transmitting and/or storing the collected data; and processing the collected data to obtain information for the cell site audit. The cell site audit can be performed by one of i) a single operator flying the UAV without a license or ii) two operators including one with a license and one to spot the UAV. The method can further include performing one or more aspects of the cell site audit without the UAV; and utilizing the UAV to perform one or more aspects of the cell site audit that would require the tower climb. The method can further include flying the UAV to another cell site, wherein, once at the another cell site, flight of the UAV is constrained in a three-dimensional rectangle at the another cell site. The collecting data, the transmitting, and the processing can include determining a down tilt angle of one or more antennas of the cell site components, plumb of the tower and/or the one or more antennas, azimuth of the one or more antennas, and Global Positioning Satellite (GPS) coordinates, for the cell site audit. An operator can operate the UAV through a mobile device to perform various aspects of the cell site audit on the cell site components, the UAV includes a camera broadcasting to the mobile device, providing a real-time view to the operator. The UAV can include one or more antennas configured to provide wireless service, and the method can further include hovering the UAV at the cell site to provide the wireless service, wherein the wireless service is provided through one of licensed or unlicensed spectrum. The method can further include utilizing the UAV to attach or detach one or more components associated with the cell site components. The method can further include hovering the UAV at the cell site to provide real-time video footage back to a mobile device or another location.

In another exemplary embodiment, an Unmanned Aerial Vehicle (UAV) configured to perform a cell site audit at a cell site, without requiring a tower climb at the cell site, includes one or more rotors disposed to a body; a camera associated with the body; wireless interfaces; a processor coupled to the wireless interfaces; and memory storing instructions that, when executed, cause the processor to: receive instructions, via the wireless interfaces, related to flight at the cell site, wherein flight of the UAV is constrained in a three-dimensional rectangle at the cell site; cause the one or more rotors to operate pursuant to the instructions; operate the camera pursuant to the instructions; and transmit, via the wireless interfaces, or store, in a data store, data from the camera, for performing the cell site audit, wherein the data is processed to data to obtain information for the cell site audit. The cell site audit can be performed by one of i) a single operator flying the UAV without a license or ii) two operators including one with a license and one to spot the UAV. One or more aspects of the cell site audit can be performed without the UAV, and wherein the UAV is utilized to perform one or more aspects of the cell site audit that would require the tower climb. The UAV can be flown to another cell site, and, once at the another cell site, flight of the UAV is constrained in a three-dimensional rectangle at the another cell site. The obtained information can include determining a down tilt angle of one or more antennas of the cell site components, plumb of the tower and/or the one or more antennas, azimuth of the one or more antennas, and Global Positioning Satellite (GPS) coordinates, for the cell site audit. An operator can operate the UAV through a mobile device to perform various aspects of the cell site audit on the cell site components, the camera broadcasting to the mobile device providing a real-time view to the operator. The UAV can include one or more antennas configured to provide wireless service, wherein the UAV is configured to hover at the cell site to provide the wireless service, wherein the wireless service is provided through one of licensed or unlicensed spectrum. The UAV can be utilized to attach or detach one or more components associated with the cell site components. The UAV can be configured to hover at the cell site to provide real-time video footage back to a mobile device or another location.

In a further exemplary embodiment, a system configured to perform a cell site audit at a cell site, without requiring a tower climb at the cell site, includes a mobile device including: mobile device wireless interfaces communicatively coupled to wireless interfaces on an Unmanned Aerial Vehicle (UAV); a display; a processor, wherein the mobile device wireless interfaces, the display, and the processor are communicatively coupled to one another; and memory storing instructions that, when executed, cause the processor to: cause the UAV to fly substantially vertically up to cell site components through communication to the UAV wireless interfaces, wherein flight of the UAV is constrained in a three-dimensional rectangle at the cell site; receive data associated with the cell site components from the UAV wireless interfaces; display the received data to the display; and process the received data to obtain information for the cell site audit. The cell site audit can be performed by one of i) a single operator flying the UAV without a license or ii) two operators including one with a license and one to spot the UAV. One or more aspects of the cell site audit can be performed without the UAV, and wherein the UAV is utilized to perform one or more aspects of the cell site audit that would require the tower climb. An operator can operate the UAV through the mobile device to perform various aspects of the cell site audit on the cell site components, the camera broadcasting to the mobile device providing a real-time view to the operator.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a mobile device, which may be used for the cell site audit or the like;

DETAILED DESCRIPTION OF THE DISCLOSURE

In various exemplary embodiments, UAV-based systems and methods are described associated with cell sites, such as for providing cell tower audits and the like, including a tethered configuration. Various aspects of UAVs are described herein to reduce tower climbs in conjunction with cell tower audits. Additional aspects are described utilizing UAVs for other functions, such as flying from cell tower to cell tower to provide audit services and the like. Advantageously, using UAVs for cell tower audits exponentially improves the safety of cell tower audits and has been shown by Applicants to reduce costs by over 40%, as well as drastically improving audit time. With the various aspects described herein, a UAV-based audit can provide superior information and quality of such information, including a 360 degree tower view. In one aspect, the systems and methods include a constrained flight zone for the UAV such as a three-dimensional rectangle (an "ice cube" shape) about the cell tower. This constrained flight zone allows the systems and methods to operate the UAV without extensive regulations such as including extra personnel for "spotting" and requiring private pilot's licenses.

The tethered configuration includes a connection between the UAV and one or more components at a cell site. The connection can include a cable, a rope, a power cable, a communications cable, a fiber optic cable, etc., i.e., any connection with strength to constrain the UAV to the cell site. One aspect of the tethered configuration is to constrain a flight path of the UAV at the cell site. Here, the UAV may be considered part of the cell site/cell tower and not a flying vehicle that is subject to airspace regulations. Another aspect of the tethered configuration is to provide power and/or communications to the UAV. Here, the UAV can maintain extended periods of flight to provide cell site audits, wireless service, visual air traffic surveillance, etc. With the connection providing power and/or communications, the UAV can fly extended time periods. The connection can be tethered to the cell tower or some associated component, to a stake, weight, fence, building structure, etc.

§1.0 Exemplary Cell Site

Figure 1:
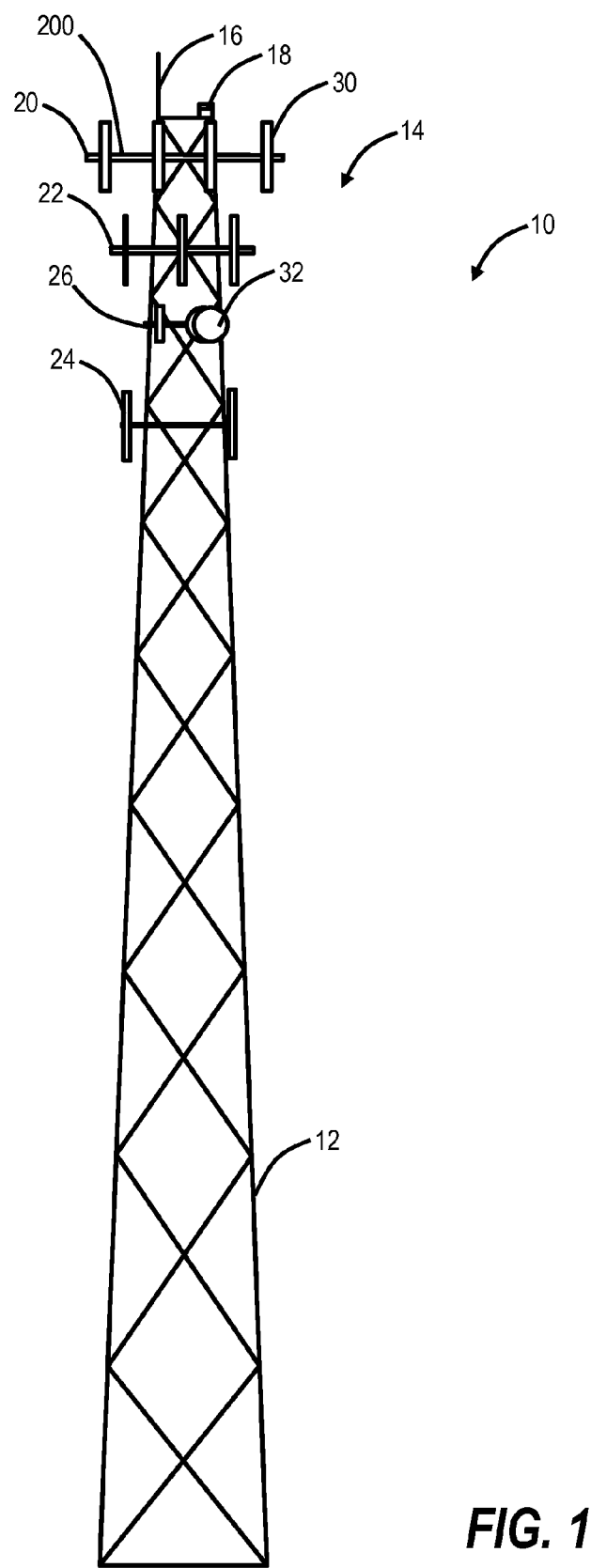
FIG. 1 is a diagram of a side view of an exemplary cell site.

Referring to FIG. 1, in an exemplary embodiment, a diagram illustrates a side view of an exemplary cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lighting rod 16 and a warning light 18. Of course, there may various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g. there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

§2.0 Cell Site Audits Via UAV

Figure 2:
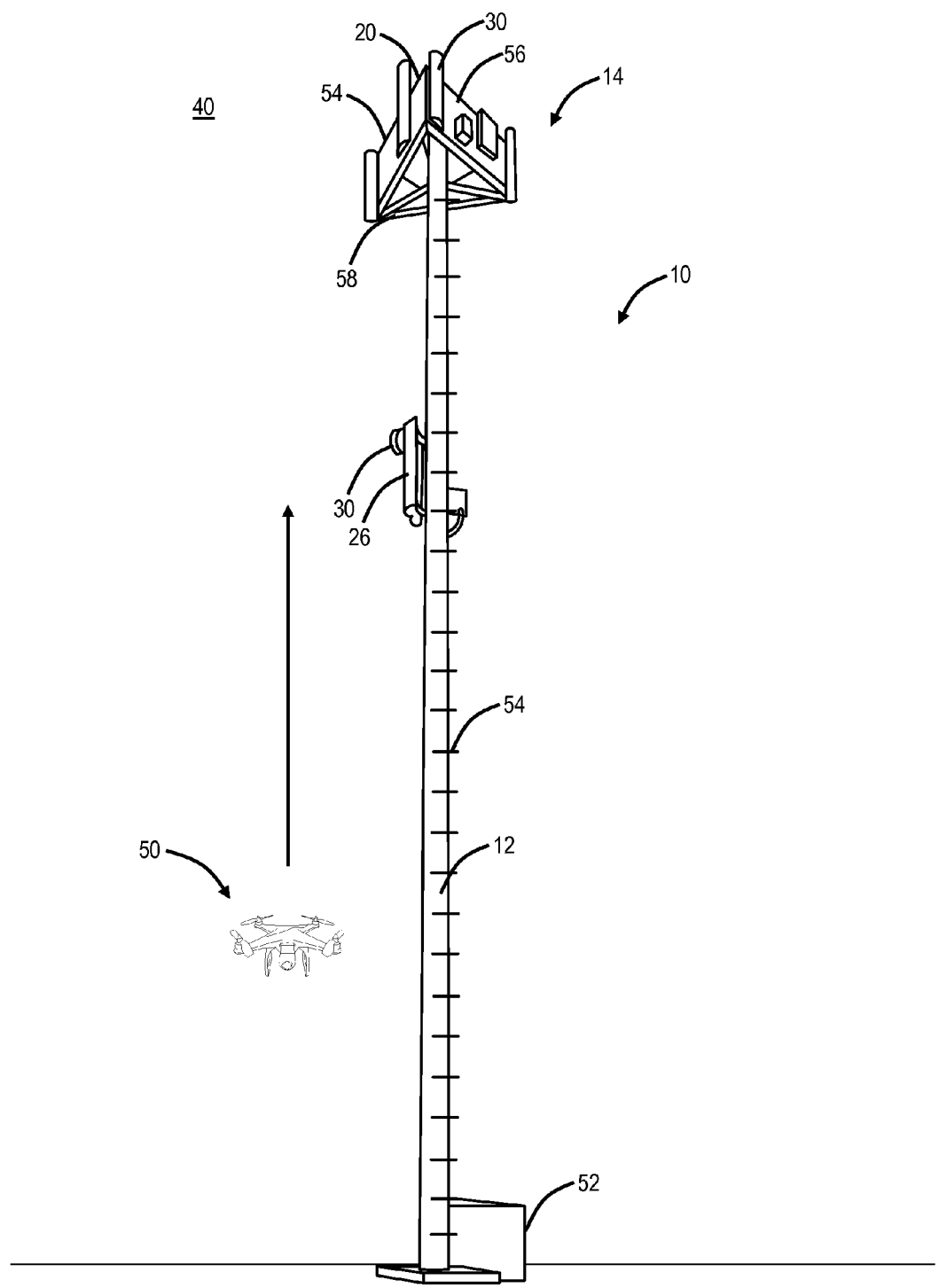
FIG. 2 is a diagram of a cell site audit performed with an unmanned aerial vehicle (UAV)

Referring to FIG. 2, in an exemplary embodiment, a diagram illustrates a cell site audit 40 performed with an unmanned aerial vehicle (UAV) 50. As described herein, the cell site audit 40 is used by service providers, third party engineering companies, tower operators, etc. to check and ensure proper installation, maintenance, and operation of the cell site components 14 and shelter or cabinet 52 equipment as well as the various interconnections between them. From a physical accessibility perspective, the cell tower 12 includes a climbing mechanism 54 for tower climbers to access the cell site components 14. FIG. 2 includes a perspective view of the cell site 10 with the sets 20, 26 of the cell site components 14. The cell site components 14 for the set 20 include three sectors—alpha sector 54, beta sector 56, and gamma sector 58.

In an exemplary embodiment, the UAV 50 is utilized to perform the cell site audit 40 in lieu of a tower climber access the cell site components 14 via the climbing mechanism 54. In the cell site audit 40, an engineer/technician is local to the cell site 10 to perform various tasks. The systems and methods described herein eliminate a need for the engineer/technician to climb the cell tower 12. Of note, it is still important for the engineer/technician to be local to the cell site 10 as various aspects of the cell site audit 40 cannot be done remotely as described herein. Furthermore, the systems and methods described herein provide an ability for a single engineer/technician to perform the cell site audit 40 without another person handling the UAV 50 or a person with a pilot's license operating the UAV 50 as described herein.

§2.1 Cell Site Audit

In general, the cell site audit 40 is performed to gather information and identify a state of the cell site 10. This is used to check the installation, maintenance, and/or operation of the cell site 10. Various aspects of the cell site audit 40 can include, without limitation:

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support
Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose Or Cross-Threaded Coax Connectors
Verify Return ("Ret") Cables
Verify Ret Connectors
Verify Ret Grounding
Verify Ret Installation -continued Verify Ret Lightning Protection Unit (LPI)
Check for Shelter/Cabinet Penetrations
Verify Surge Arrestor Installation/Grounding
Verify Site Cleanliness
Verify LTE GPS Antenna Installation Of note, the cell site audit 40 includes gathering information at and inside the shelter or cabinet 52, on the cell tower 12, and at the cell site components 14. Note, it is not possible to perform all of the above items solely with the UAV 50 or remotely.

§3.0 Piloting the UAV at the Cell Site

It is important to note that the Federal Aviation Administration (FAA) is in the process of regulating commercial UAV (drone) operation. It is expected that these regulations would not be complete until 2016 or 2017. In terms of these regulations, commercial operation of the UAV 50, which would include the cell site audit 40, requires at least two people, one acting as a spotter and one with a pilot's license. These regulations, in the context of the cell site audit 40, would make use of the UAV 50 impractical. To that end, the systems and methods described herein propose operation of the UAV 50 under FAA exemptions which allow the cell site audit 40 to occur without requiring two people and without requiring a pilot's license. Here, the UAV 50 is constrained to fly up and down at the cell site 10 and within a three-dimensional (3D) rectangle at the cell site components. These limitations on the flight path of the UAV 50 make the use of the UAV 50 feasible at the cell site 10.

Figure 3:
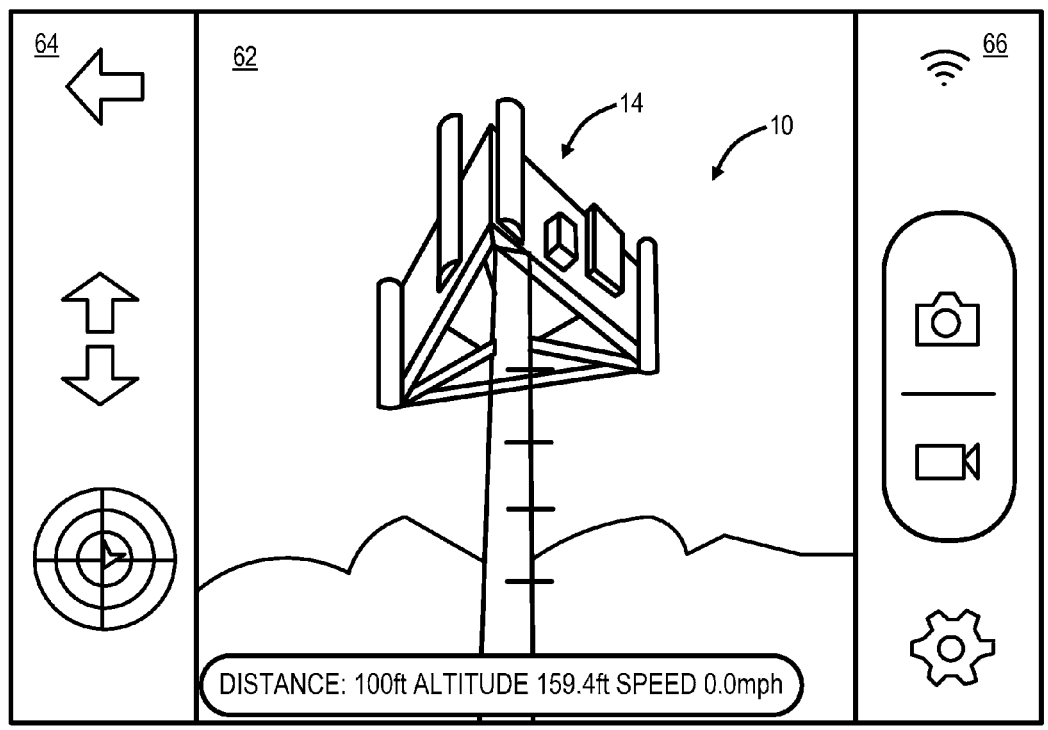
FIG. 3 is a screen diagram of a view of a graphical user interface (GUI) on a mobile device while piloting the UAV.

Referring to FIG. 3, in an exemplary embodiment, a screen diagram illustrates a view of a graphical user interface (GUI) 60 on a mobile device 100 while piloting the UAV 50. The GUI 60 provides a real-time view to the engineer/technician piloting the UAV 50. That is, a screen 62 provides a view from a camera on the UAV 50. As shown in FIG. 3, the cell site 10 is shown with the cell site components 14 in the view of the screen 62. Also, the GUI 60 have various controls 64, 66. The controls 64 are used to pilot the UAV 50 and the controls 66 are used to perform functions in the cell site audit 40 and the like.

§4.0 Exemplary Hardware

Figure 4:
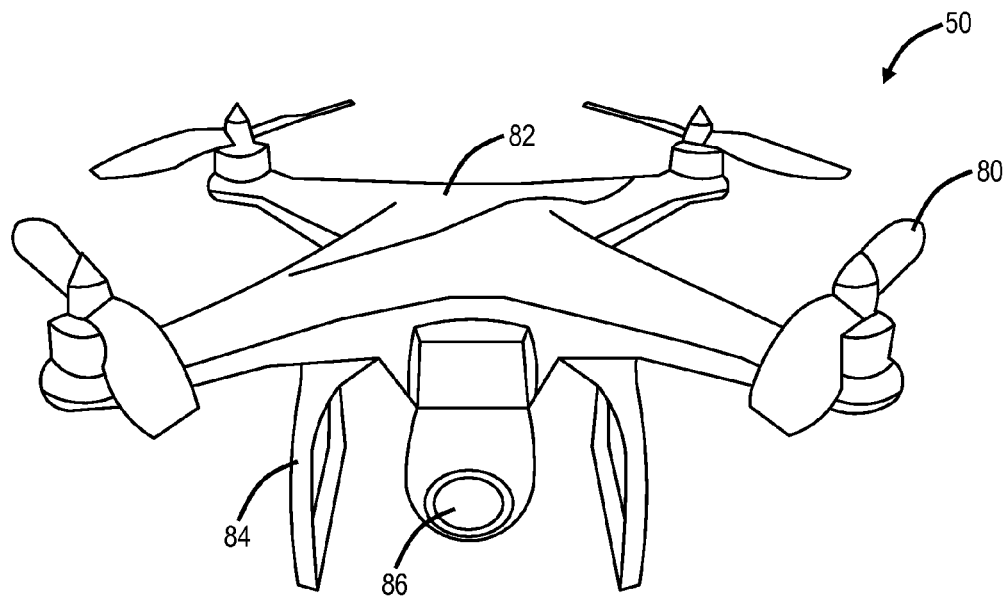
FIG. 4 is a perspective view of an exemplary UAV for use with the systems and methods described herein'

Referring to FIG. 4, in an exemplary embodiment, a perspective view illustrates an exemplary UAV 50 for use with the systems and methods described herein. Again, the UAV 50 may be referred to as a drone or the like. The UAV 50 may be a commercially available UAV platform that has been modified to carry specific electronic components as described herein to implement the various systems and methods. The UAV 50 includes rotors 80 attached to a body 82. A lower frame 84 is located on a bottom portion of the body 82, for landing the UAV 50 to rest on a flat surface and absorb impact during landing. The UAV 50 also includes a camera 86 which is used to take still photographs, video, and the like. Specifically, the camera 86 is used to provide the real-time display on the screen 62. The UAV 50 includes various electronic components inside the body 82 and/or the camera 86 such as, without limitation, a processor, a data store, memory, a wireless interface, and the like. Also, the UAV 50 can include additional hardware, such as robotic arms or the like that allow the UAV 50 to attach/detach components for the cell site components 14. Specifically, it is expected that the UAV 50 will get bigger and more advanced, capable of carrying significant loads, and not just a wireless camera. The present disclosure contemplates using the UAV 50 for various aspects at the cell site 10, including participating in construction or deconstruction of the cell tower 12, the cell site components 14, etc.

These various components are now described with reference to a mobile device 100. Those of ordinary skill in the art will recognize the UAV 50 can include similar components to the mobile device 100. Of note, the UAV 50 and the mobile device 100 can be used cooperatively to perform various aspects of the cell site audit 40 described herein. In other embodiments, the UAV 50 can be operated with a controller instead of the mobile device 100. The mobile device 100 may solely be used for real-time video from the camera 86 such as via a wireless connection (e.g., IEEE 802.11 or variants thereof). Some portions of the cell site audit 40 can be performed with the UAV 50, some with the mobile device 100, and others solely by the operator though visual inspection. In some embodiments, all of the aspects can be performed in the UAV 50. In other embodiments, the UAV 50 solely relays data to the mobile device 100 which performs all of the aspects. Other embodiments are also contemplated.

Figure 5:
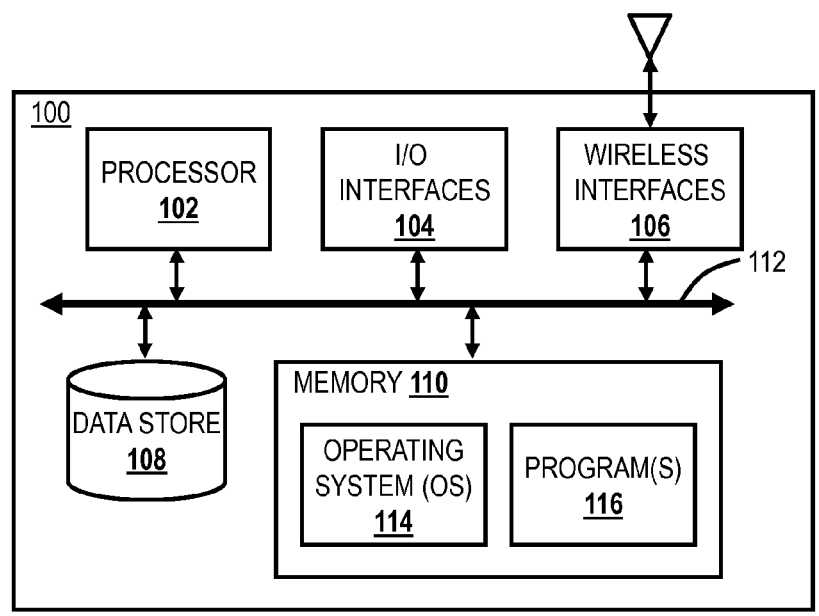

Referring to FIG. 5, in an exemplary embodiment, a block diagram illustrates a mobile device 100, which may be used for the cell site audit 40 or the like. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 5 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an exemplary embodiment, the processor 102 may include a mobile optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e. camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (Wi-MAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with the UAV 50 for command and control as well as to relay data therebetween. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 can include one or more software programs, each of which includes an ordered listing of executable instructions for implementing logical functions. In the example of FIG. 5, the software in the memory 110 includes a suitable operating system (O/S) 114 and programs 116. The operating system 114 essentially controls the execution of other computer programs, and provides scheduling, input-output control, file and data management, memory management, and communication control and related services. The programs 116 may include various applications, add-ons, etc. configured to provide end user functionality with the mobile device 100, including performing various aspects of the systems and methods described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

§5.0 Cell Site Audit with UAV and/or Mobile Device

Figure 6:
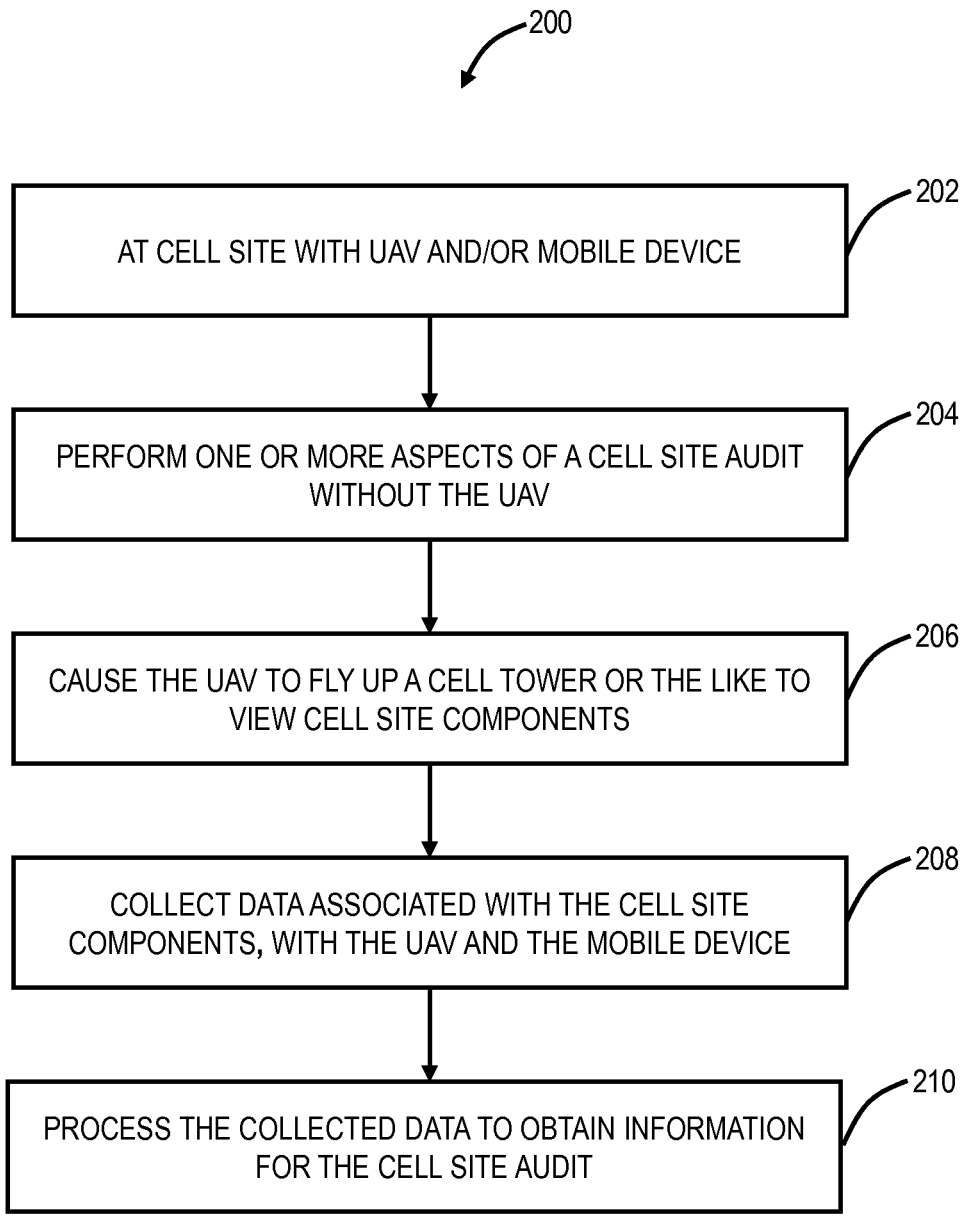
FIG. 6 is a flow chart of a cell site audit method utilizing the UAV and the mobile device.

Referring to FIG. 6, in an exemplary embodiment, a flow chart illustrates a cell site audit method 200 utilizing the UAV 50 and the mobile device 100. Again, in various exemplary embodiments, the cell site audit 40 can be performed with the UAV 50 and the mobile device 100. In other exemplary embodiments, the cell site audit 40 can be performed with the UAV 50 and an associated controller. In other embodiments, the mobile device 100 is solely used to relay real-time video from the camera 86. While the steps of the cell site audit method 200 are listed sequentially, those of ordinary skill in the art will recognize some or all of the steps may be performed in a different order. The cell site audit method 200 includes an engineer/technician at a cell site with the UAV 50 and the mobile device 100 (step 202). Again, one aspect of the systems and methods described herein is usage of the UAV 50, in a commercial setting, but with constraints such that only one operator is required and such that the operator does not have to hold a pilot's license. As described herein, the constraints can include flight of the UAV 50 at or near the cell site 10 only, a flight pattern up and down in a 3D rectangle at the cell tower 12, a maximum height restriction (e.g., 500 feet or the like), and the like. For example, the cell site audit 40 is performed by one of i) a single operator flying the UAV 50 without a license or ii) two operators including one with a license and one to spot the UAV 50.

The engineer/technician performs one or more aspects of the cell site audit 40 without the UAV 50 (step 204). Note, there are many aspects of the cell site audit 40 as described herein. It is not possible for the UAV 50 to perform all of these items such that the engineer/technician could be remote from the cell site 10. For example, access to the shelter or cabinet 52 for audit purposes requires the engineer/technician to be local. In this step, the engineer/technician can perform any audit functions as described herein that do not require climbing.

The engineer/technician can cause the UAV 50 to fly up the cell tower 12 or the like to view cell site components 14 (step 206). Again, this flight can be based on the constraints, and the flight can be through a controller and/or the mobile device 100. The UAV 50 and/or the mobile device 100 can collect data associated with the cell site components 14 (step 208), and process the collected data to obtain information for the cell site audit 40 (step 210). As described herein, the UAV 50 and the mobile device 100 can be configured to collect data via video and/or photographs. The engineer/technician can use this collected data to perform various aspects of the cell site audit 40 with the UAV 50 and the mobile device 100 and without a tower climb.

The foregoing descriptions detail specific aspects of the cell site audit 40 using the UAV 50 and the mobile device 100. In these aspects, data can be collected—generally, the data is video or photographs of the cell site components 14. The processing of the data can be automated through the UAV 50 and/or the mobile device 100 to compute certain items as described herein. Also, the processing of the data can be performed either at the cell site 10 or afterwards by the engineer/technician.

In an exemplary embodiment, the UAV 50 can be a commercial, "off-the-shelf" drone with a Wi-Fi enabled camera for the camera 86. Here, the UAV 50 is flown with a controller pad which can include a joystick or the like. Alternatively, the UAV 50 can be flown with the mobile device 100, such as with an app installed on the mobile device 100 configured to control the UAV 50. The Wi-Fi enable camera is configured to communicate with the mobile device 100—to both display real-time video and audio as well as to capture photos and/or video during the cell site audit 40 for immediate processing or for later processing to gather relevant information about the cell site components 14 for the cell site audit 40.

In another exemplary embodiment, the UAV 50 can be a so-called "drone in a box" which is preprogrammed/configured to fly a certain route, such as based on the flight constraints described herein. The "drone in a box" can be physically transported to the cell site 10 or actually located there. The "drone in a box" can be remotely controlled as well.

§5.1 Antenna Down Tilt Angle

In an exemplary aspect of the cell site audit 40, the UAV 50 and/or the mobile device 100 can be used to determine a down tilt angle of individual antennas 30 of the cell site components 14. The down tilt angle can be determined for all of the antennas 30 in all of the sectors 54, 56, 58. The down tilt angle is the mechanical (external) down tilt of the antennas 30 relative to a support bar 200. In the cell site audit 40, the down tilt angle is compared against an expected value, such as from a Radio Frequency (RF) data sheet, and the comparison may check to ensure the mechanical (external) down tilt is within ±1.0° of specification on the RF data sheet.

Using the UAV 50 and/or the mobile device 100, the down tilt angle is determined from a photo taken from the camera 86. In an exemplary embodiment, the UAV 50 and/or the mobile device 100 is configured to measure three points—two defined by the antenna 30 and one by the support bar 200 to determine the down tilt angle of the antenna 30. For example, the down tilt angle can be determined visually from the side of the antenna 30—measuring a triangle formed by a top of the antenna 30, a bottom of the antenna 30, and the support bar 200.

§5.2 Antenna Plumb

In an exemplary aspect of the cell site audit 40 and similar to determining the down tilt angle, the UAV 50 and/or the mobile device 100 can be used to visually inspect the antenna 30 including its mounting brackets and associated hardware. This can be done to verify appropriate hardware installation, to verify the hardware is not loose or missing, and to verify that antenna 30 is plumb relative to the support bar 200.

§5.3 Antenna Azimuth

In an exemplary aspect of the cell site audit 40, the UAV 50 and/or the mobile device 100 can be used to verify the antenna azimuth, such as verifying the antenna azimuth is oriented within ±5° as defined on the RF data sheet. The azimuth (AZ) angle is the compass bearing, relative to true (geographic) north, of a point on the horizon directly beneath an observed object. Here, the UAV 50 and/or the mobile device 100 can include a location determining device such as a Global Positioning Satellite (GPS) measurement device. The antenna azimuth can be determined with the UAV 50 and/or the mobile device 100 using an aerial photo or the GPS measurement device.

§5.4 Photo Collections

As part of the cell site audit 40 generally, the UAV 50 and/or the mobile device 100 can be used to document various aspects of the cell site 10 by taking photos or video. For example, the mobile device 100 can be used to take photos or video on the ground in or around the shelter or cabinet 52 and the UAV 500 can be used to take photos or video up the cell tower 12 and of the cell site components 14. The photos and video can be stored in any of the UAV 50, the mobile device 100, the cloud, etc.

In an exemplary embodiment, the UAV can also hover at the cell site 10 and provide real-time video footage back to the mobile device 100 or another location (for example, a Network Operations Center (NOC) or the like).

§5.5 Compound Length/Width

The UAV 50 can be used to fly over the cell site 10 to measure the overall length and width of the cell site 10 compound from overhead photos. In one aspect, the UAV 50 can use GPS positioning to detect the length and width by flying over the cell site 10. In another aspect, the UAV 50 can take overhead photos which can be processed to determine the associated length and width of the cell site 10.

§5.6 Data Capture—Cell Site Audit

The UAV 50 can be used to capture various pieces of data via the camera 86. That is, with the UAV 50 and the mobile device 100, the camera 86 is equivalent to the engineer/technician's own eyes, thereby eliminating the need for the engineer/technician to physically climb the tower. One important aspect of the cell site audit 40 is physically collecting various pieces of information—either to check records for consistency or to establish a record. For example, the data capture can include determining equipment module types, locations, connectivity, serial numbers, etc. from photos. The data capture can include determining physical dimensions from photos or from GPS such as the cell tower 12 height, width, depth, etc. The data capture can also include visual inspection of any aspect of the cell site 10, cell tower 12, cell site components 14, etc. including, but not limited to, physical characteristics, mechanical connectivity, cable connectivity, and the like.

The data capture can also include checking the lighting rod 16 and the warning light 18 on the cell tower 12. Also, with additional equipment on the UAV 50, the UAV 50 can be configured to perform maintenance such as replacing the warning light 18, etc. The data capture can also include checking maintenance status of the cell site components 14 visually as well as checking associated connection status. Another aspect of the cell site audit 40 can include checking structural integrity of the cell tower 12 and the cell site components 14 via photos from the UAV 50.

§5.7 Flying the UAV at the Cell Site

In an exemplary embodiment, the UAV 50 can be programmed to automatically fly to a location and remain there without requiring the operator to control the UAV 50 in real-time, at the cell site 10. In this scenario, the UAV 50 can be stationary at a location in the air at the cell site 10. Here, various functionality can be incorporated in the UAV 50 as described herein. Note, this aspect leverages the ability to fly the UAV 50 commercially based on the constraints described herein. That is, the UAV 50 can be used to fly around the cell tower 12, to gather data associated with the cell site components 14 for the various sectors 54, 56, 58. Also, the UAV 50 can be used to hover around the cell tower 12, to provide additional functionality described as follows.

§5.8 Video/Photo Capture—Cell Site

With the UAV 50 available to operate at the cell site 10, the UAV 50 can also be used to capture video/photos while hovering. This application uses the UAV 50 as a mobile video camera to capture activity at or around the cell site 10 from the air. It can be used to document work at the cell site 10 or to investigate the cell site 10 responsive to problems, e.g. tower collapse. It can be used to take surveillance video of surrounding locations such as service roads leading to the cell site 10, etc.

§5.9 Wireless Service Via the UAV

Again, with the ability to fly at the cell site 10, subject to the constraints, the UAV 50 can be used to provide temporary or even permanent wireless service at the cell site 10. This is performed with the addition of wireless service-related components to the UAV 50. In the temporary mode, the UAV 50 can be used to provide service over a short time period, such as responding to an outage or other disaster affecting the cell site 10. Here, an operator can cause the UAV 50 to fly where the cell site components 14 are and provide such service. The UAV 50 can be equipped with wireless antennas to provide cell service, Wireless Local Area Network (WLAN) service, or the like. The UAV 50 can effectively operate as a temporary tower or small cell as needed.

In the permanent mode, the UAV 50 (along with other UAVs 50) can constantly be in the air at the cell site 10 providing wireless service. This can be done similar to the temporary mode, but over a longer time period. The UAV 50 can be replaced over a predetermined time to refuel or the like. The replacement can be another UAV 50. The UAV 50 can effectively operate as a permanent tower or small cell as needed.

§6.0 Flying the UAV from Cell Site to Another Cell Site

Figure 7:
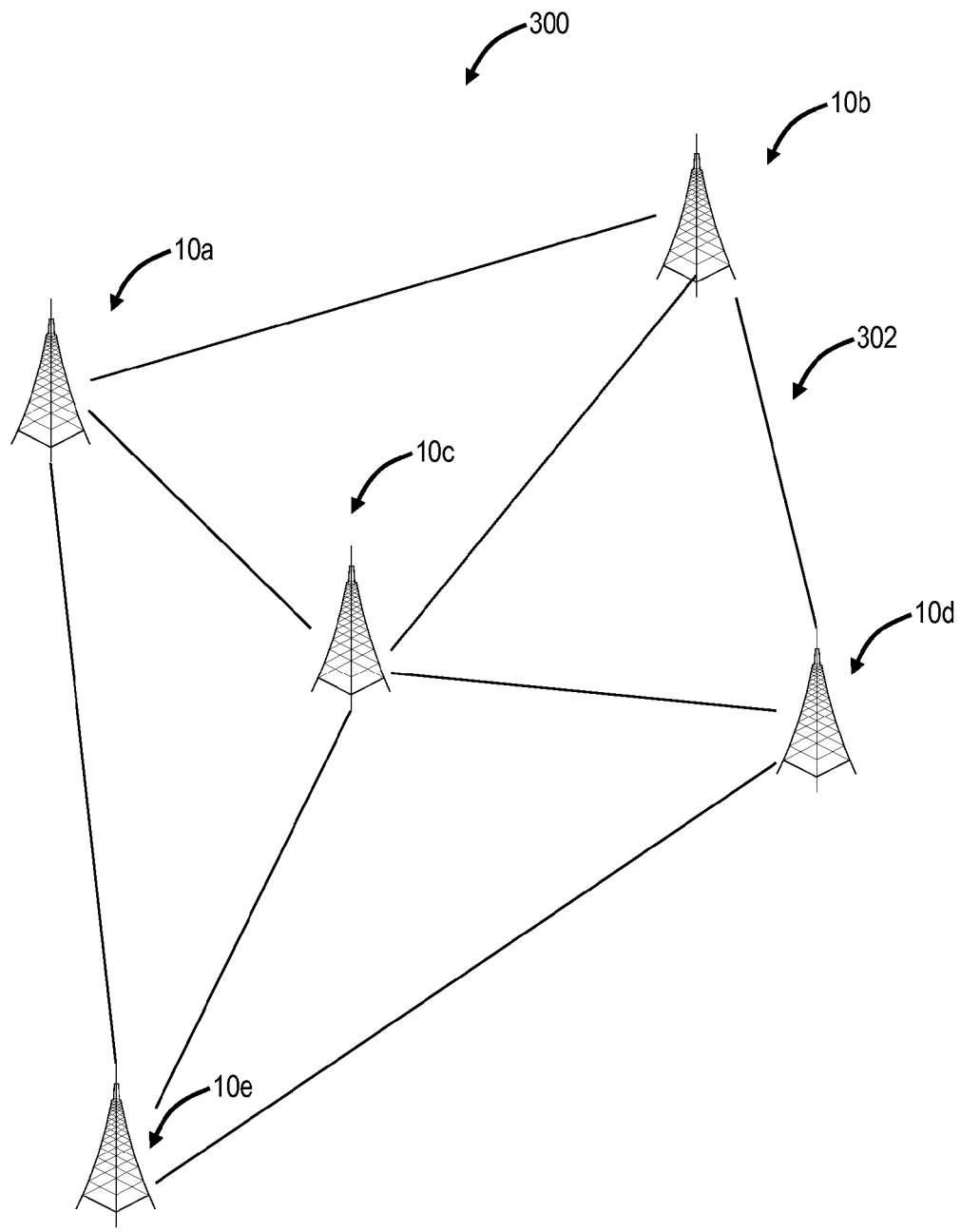
FIG. 7 is a network diagram of various cell sites deployed in a geographic region.

As described herein, the flight constraints include operating the UAV 50 vertically in a defined 3D rectangle at the cell site 10. In another exemplary embodiment, the flight constraints can be expanded to allow the 3D rectangle at the cell site 10 as well as horizontal operation between adjacent cell sites 10. Referring to FIG. 7, in an exemplary embodiment, a network diagram illustrates various cell sites 10a-10e deployed in a geographic region 300. In an exemplary embodiment, the UAV 50 is configured to operate as described herein, such as in FIG. 2, in the vertical 3D rectangular flight pattern, as well as in a horizontal flight pattern between adjacent cell sites 10. Here, the UAV 50 is cleared to fly, without the commercial regulations, between the adjacent cell sites 10.

In this manner, the UAV 50 can be used to perform the cell site audits 40 at multiple locations—note, the UAV 50 does not need to land and physically be transported to the adjacent cell sites 10. Additionally, the fact that the FAA will allow exemptions to fly the UAV 50 at the cell site 10 and between adjacent cell sites 10 can create an interconnected mesh network of allowable flight paths for the UAV 50. Here, the UAV 50 can be used for other purposes besides those related to the cell site 10. That is, the UAV 50 can be flown in any application, independent of the cell sites 10, but without requiring FAA regulation. The applications can include, without limitation, a drone delivery network, a drone surveillance network, and the like.

As shown in FIG. 7, the UAV 50, at the cell site 10a, can be flown to any of the other cell sites 10b-10e along flight paths 302. Due to the fact that cell sites 10 are numerous and diversely deployed in the geographic region 300, an ability to fly the UAV 50 at the cell sites 10 and between adjacent cell sites 10 creates an opportunity to fly the UAV 50 across the geographic region 300, for numerous applications.

§7.0 UAV and Cell Towers

Additionally, the systems and methods describe herein contemplate practically any activity at the cell site 10 using the UAV 50 in lieu of a tower climb. This can include, without limitation, any tower audit work with the UAV 50, any tower warranty work with the UAV 50, any tower operational ready work with the UAV 50, any tower construction with the UAV 50, any tower decommissioning/deconstruction with the UAV 50, any tower modifications with the UAV 50, and the like.

§8.0 Tethered UAV Systems and Methods

Figure 8:
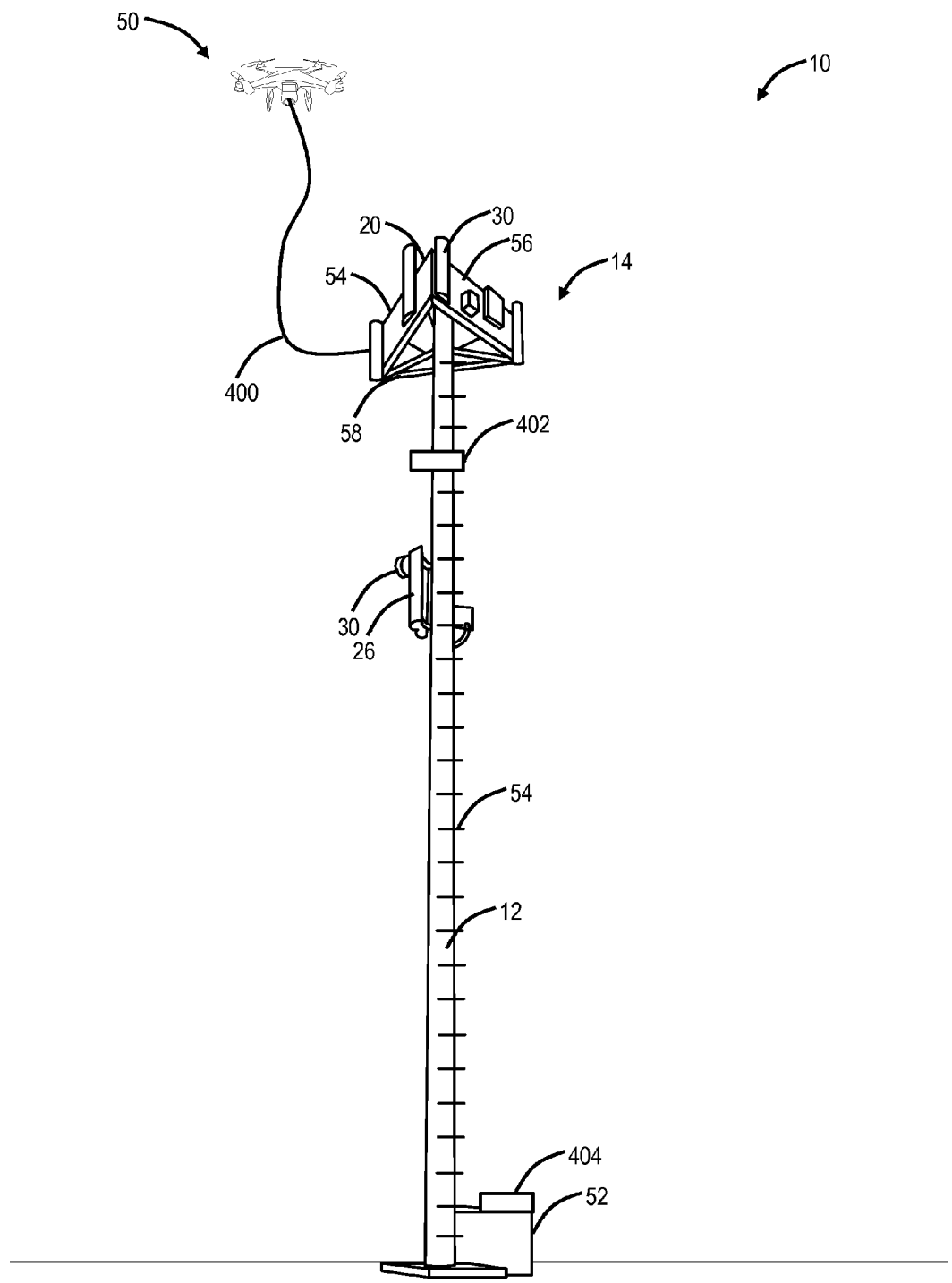
FIG. 8 is a diagram of a tethered configuration with a UAV at a cell site.
Figure 9:
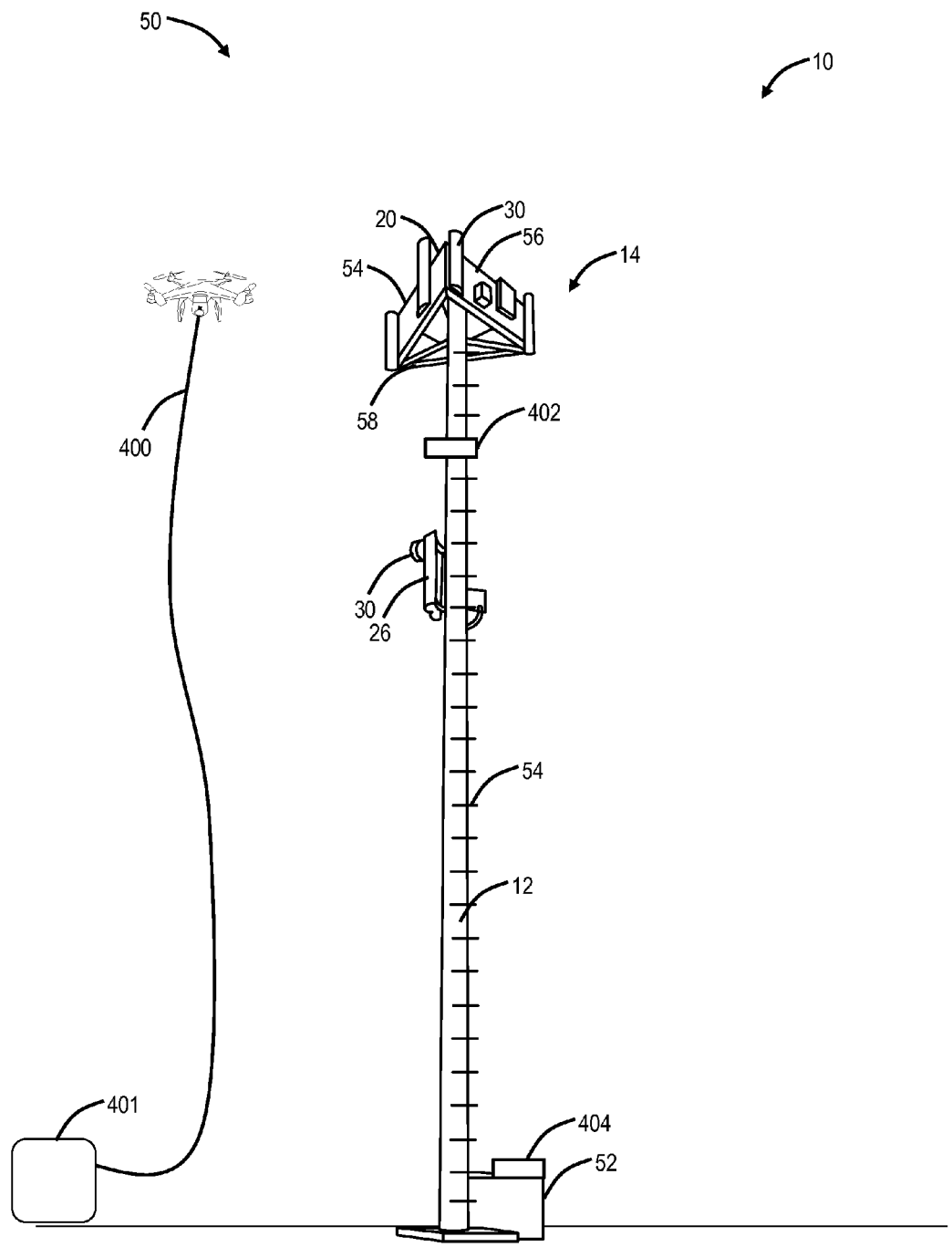
FIG. 9 is a diagram of another tethered configuration with a UAV at a cell site.
Figure 10:
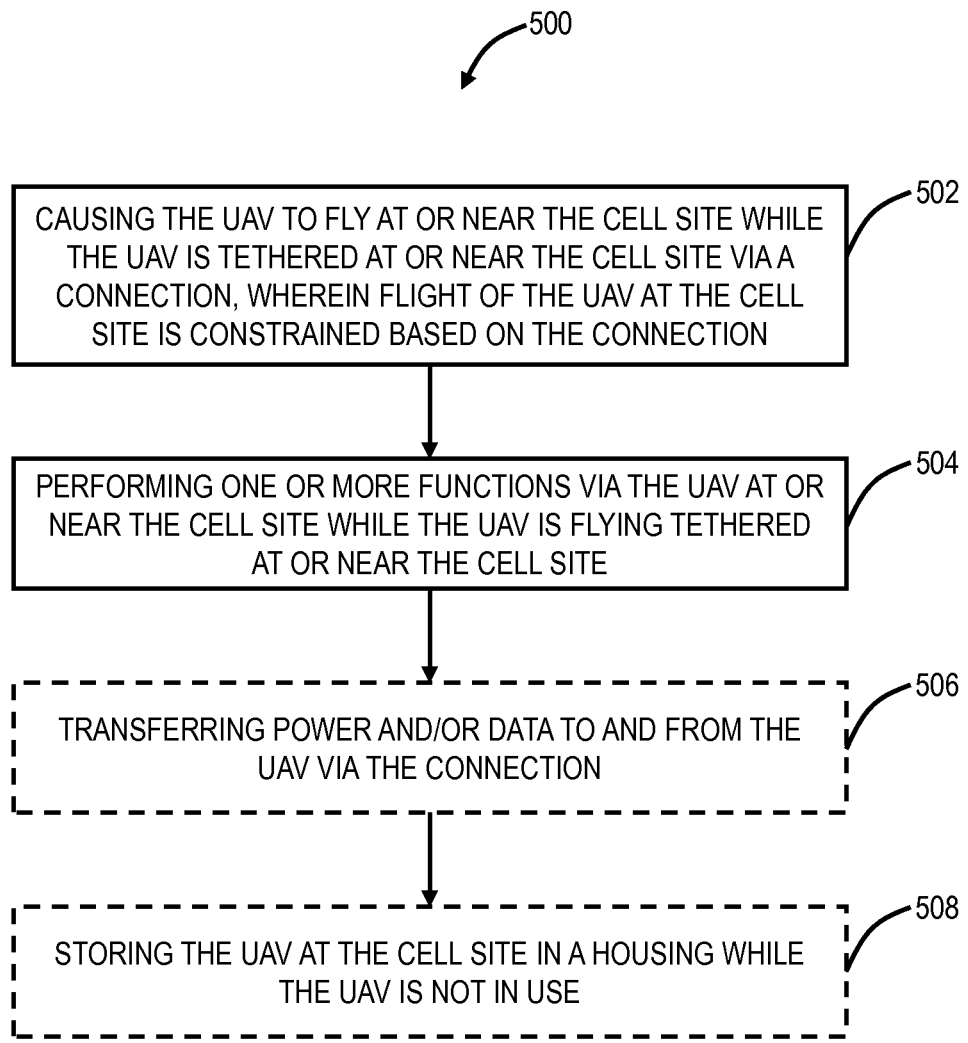
FIG. 10 is a flowchart of a method with a tethered UAV associated with a cell site.

Referring to FIGS. 8 and 9, in an exemplary embodiment, diagrams illustrate a cell site 10 for illustrating the UAV 50 and associated tethered UAV systems and methods. Specifically, FIGS. 8 and 9 is similar to FIG. 2, but here, the UAV 50 is tethered at or near the cell site 10 via a connection 400. The connection 400 can include a cable, a rope, a power cable, a communications cable, a fiber optic cable, etc., i.e., any connection with strength to constrain the UAV 50 to the cell site 10. In an exemplary embodiment in FIG. 8, the connection 400 is tethered to the top of the cell tower 12, such as at the cell site components 14 or at one of the alpha sector 54, beta sector 56, and gamma sector 58. In another exemplary embodiment in FIG. 8, the connection 400 is tethered to the cell tower 12 itself, such as at any point between the base and the top of the cell tower 12. In a further exemplary embodiment in FIG. 8, the connection 400 is tethered to the bottom of the cell site 10, such as at the shelter or cabinet 52 or a base of the cell tower 12. Specifically, in FIG. 8, the tethered configuration includes the connection 400 coupled to some part of the cell tower 12 or the like.

In FIG. 9, the tethered configuration includes the connection 400 coupled to something that is not part of the cell tower 12, such as a connection point 401, i.e., in FIG. 9, the UAV 50 is tethered at or near the cell site 10 and, in FIG. 8, the UAV 50 is tethered at the cell tower 12. In various exemplary embodiments, the connection point 401 can include, without limitation, a stake, a pole, a weight, a fence, a communications device, a wireless radio, a building or other structure, or any other device or object at or near the cell site 12. As described herein, the UAV 50 is in a tethered configuration where the UAV 50 is coupled at or near the cell site 10 via the connection 400.

In an exemplary embodiment, the UAV 50 can be housed or located at or near the cell site 10, connected via the connection 400, and stored in housings 402, 404, for example. The housings 402, 404 are shown for illustration purposes, and different locations are also contemplated. The housing 402 is on the cell tower 12, and the housing 404 is at or part of the shelter or cabinet 52. In operation, the UAV 50 is configured to selectively enter/exit the housing 402, 404. The connection 400 can be tethered to or near the housing 402, 404. The housing 402, 404 can include a door that selectively opens/closes. Alternatively, the housing 402, 404 includes an opening where the UAV 50 enters and exits. The housing 402, 404 can be used to store the UAV 50 while not in operation.

One unique aspect of the tethered configuration described herein, i.e., the UAV 50 with the connection 400, is that the UAV 50 can now be viewed as an attached device to the cell site 10, and not a free-flying drone. Advantageously, such a configuration can avoid airspace regulations or restrictions. Furthermore, with the connection 400 providing power and/or data connectivity, the UAV 50 contemplates extended periods of time for operation.

As costs decrease, it is feasible to deploy the UAV 50 with the connections 400 and optionally the housing 402, 404 at all cell sites 10. The UAV 50 with the connection 400 contemplates implementing all of the same functionality described herein with respect to FIGS. 1-6. Specifically, the UAV 50 with the connection 400 can be used to perform the cell site audit 40 and the like as well as other features. Also, the UAV 50 with the connection 400 is ideal to act as a wireless access point for wireless service. Here, the connection 400 can provide data and/or power, and be used for 1) additional capacity as needed or 2) a protection antenna to support active components in the cell site components 14 that fail. The UAV 50 with the connection 400 can be used to support overflow capacity as well as needed, providing LTE, WLAN, WiMAX, or any other wireless connectivity. Alternatively, the UAV 50 can be used as an alternative service provider to provide wireless access at the cell site 10 without requiring antennas on the cell tower 12.

Referring to FIG. 8, in an exemplary embodiment, a flowchart illustrates a method 500 with a tethered Unmanned Aerial Vehicle (UAV) associated with a cell site. The method 500 includes causing the UAV to fly at or near the cell site while the UAV is tethered at or near the cell site via a connection, wherein flight of the UAV at or near the cell site is constrained based on the connection (step 502); and performing one or more functions via the UAV at or near the cell site while the UAV is flying tethered at or near the cell site (step 504).

The method 500 can further include transferring power and/or data to and from the UAV via the connection (step 506). The connection can include one or more of a cable, a rope, a power cable, a communications cable, and a fiber optic cable. The one or more functions can include functions related to a cell site audit. The one or more functions can include functions related to providing wireless service via the UAV at the cell site, wherein data and/or power is transferred between the UAV and the cell site to perform the wireless service. The one or more functions can include providing visual air traffic control via one or more cameras on the UAV. The method 500 can further include storing the UAV at the cell site in a housing while the UAV is not in use. The UAV can be configured to fly extended periods at the cell site utilizing power from the connection, where the extended periods are longer than if the UAV did not have power from the connection. The connection can be configured to constrain a flight path of the UAV at the cell site.

In another exemplary embodiment, a tethered Unmanned Aerial Vehicle (UAV) associated with a cell site includes one or more rotors disposed to a body, wherein the body is tethered to the cell site via a connection; a camera associated with the body; wireless interfaces; a processor coupled to the wireless interfaces and the camera; and memory storing instructions that, when executed, cause the processor to: process commands to cause the one or more rotors to fly the UAV at the cell site while the UAV is tethered to the cell site via the connection, wherein flight of the UAV at the cell site is constrained based on the connection; and perform one or more functions via the UAV at the cell site while the UAV is flying tethered to the cell site, utilizing one or more of the camera and the wireless interfaces.

§8.1 Tethered UAV Systems and Methods—Visual Air Traffic Control

In an exemplary embodiment, the tethered UAV 50 can be configured to provide visual air traffic control such as for other UAVs or drones. Here, various tethered UAVs 50 can be deployed across a geographic region at various cell sites 10 and each UAV 50 can have one or more cameras that can provide a 360 degree view around the cell site 10. This configuration essentially creates a drone air traffic control system that could be monitored and controlled by Network Control Center (NOC). Specifically, the UAV 50 can be communicatively coupled to the NOC, such as via the connection 400. The NOC can provide the video feeds of other drones to third parties (e.g., Amazon) and other drone users to comply with current FAA regulations that require eyes on drones at all times.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method with a tethered Unmanned Aerial Vehicle (UAV) associated with a cell site, the method comprising:
    causing the UAV to fly at or near the cell site comprising a cell tower with cell site components while the UAV is tethered at or near the cell site via a connection, wherein flight of the UAV at or near the cell site is constrained based on the connection such that the UAV is an attached device to the cell site;
    performing one or more functions for a cell site audit via the UAV at or near the cell site while the UAV is flying tethered at or near the cell site;
    storing the UAV at the cell site in a housing while the UAV is not in use, wherein the housing comprises a door that selectively opens and closes for the UAV, and wherein the housing is one of i) on a cell tower at the cell site and ii) at or part of a shelter or cabinet at the cell site, wherein the one or more functions comprise functions related to a cell site audit which is performed by a user remotely from the cell site with the UAV already located at the cell site,
    wherein the cell site audit comprises obtaining data remotely via the UAV tethered at or near the cell site, the data comprising a plurality of a down tilt angle of one or more antennas of the cell site components, plumb of the cell tower and/or the one or more antennas, azimuth of the one or more antennas, Global Positioning Satellite (GPS) coordinates, dimension of the cell site components, equipment type and serial number of the cell site components, connections between the cell site components, and status of a lighting rod and warning light on the cell tower.

2. The method of claim 1, further comprising:
    transferring power and/or data to and from the UAV via the connection.

3. The method of claim 1, wherein the connection comprises one or more of a cable, a rope, a power cable, a communications cable, and a fiber optic cable.

4. The method of claim 1, wherein the one or more functions comprise functions related to providing wireless service via the UAV at or near the cell site, wherein data and/or power is transferred via the connection perform the wireless service.

5. The method of claim 1, wherein the UAV is configured to fly extended periods at or near the cell site utilizing power from the connection.

6. The method of claim 1, wherein the connection is configured to constrain a flight path of the UAV at or near the cell site.

7. The method of claim 1, wherein the one or more functions comprise providing visual air traffic control via one or more cameras on the UAV.

8. The method of claim 1, wherein the connection is tethered to a connection point comprising any of a stake, a pole, a weight, a fence, a communications device, a wireless radio, a building or other structure at or near the cell site, and a component associated with a cell tower at the cell site.

9. A tethered Unmanned Aerial Vehicle (UAV) associated with a cell site comprising a cell tower with cell site components, the tethered UAV comprising:
- one or more rotors disposed to a body, wherein the body is tethered to the cell site via a connection;
- a camera associated with the body;
- wireless interfaces;
- a processor coupled to the wireless interfaces and the camera; and
- memory storing instructions that, when executed, cause the processor to:
  - process commands to cause the one or more rotors to fly the UAV at or near the cell site while the UAV is tethered at or near the cell site via the connection, wherein flight of the UAV at or near the cell site is constrained based on the connection such that the UAV is an attached device to the cell site;
  - perform one or more functions for a cell site audit via the UAV at or near the cell site while the UAV is flying tethered at or near the cell site, utilizing one or more of the camera and the wireless interfaces,
- wherein the UAV is stored at or near the cell site in a housing while the UAV is not in use, wherein the housing comprises a door that selectively opens and closes for the UAV, and wherein the housing is one of i) on a cell tower at the cell site and ii) at or part of a shelter or cabinet at the cell site,
- wherein the one or more functions comprise functions related to a cell site audit which is performed remotely from the cell site with the UAV already located at the cell site, and
- wherein the cell site audit comprises obtaining data remotely via the UAV tethered at or near the cell site, the data comprising a plurality of a down tilt angle of one or more antennas of the cell site components, plumb of the cell tower and/or the one or more antennas, azimuth of the one or more antennas, Global Positioning Satellite (GPS) coordinates, dimension of the cell site components, equipment type and serial number of the cell site components, connections between the cell site components, and status of a lighting rod and warning light on the cell tower.

10. The UAV of claim 9, wherein power and/or data is transferred to and from the UAV via the connection.

11. The UAV of claim 9, wherein the connection comprises one or more of a cable, a rope, a power cable, a communications cable, and a fiber optic cable.

12. The UAV of claim 9, wherein the one or more functions comprise functions related to providing wireless service via the UAV at or near the cell site, wherein data and/or power is transferred via the connection to perform the wireless service.

13. The UAV of claim 9, wherein the UAV is configured to fly extended periods at or near the cell site utilizing power from the connection.

14. The UAV of claim 9, wherein the connection is configured to constrain a flight path of the UAV at or near the cell site.

15. The UAV of claim 9, wherein the UAV is tethered to a connection point comprising any of a component associated with a cell tower at the cell site, a stake, a pole, a weight, a fence, a communications device, a wireless radio, and a building or other structure at or near the cell site.

16. A cell site, comprising:
- a cell tower with cell site components associated therewith;
- a housing at the cell site storing an Unmanned Aerial Vehicle (UAV), wherein the UAV is tethered at the cell site via a connection;
- wherein the UAV is configured to fly at or near the cell site responsive to a command while the UAV is tethered at or near the cell site via the connection, wherein flight of the UAV at or near the cell site is constrained based on the connection such that the UAV is an attached device to the cell site;
- wherein the UAV is configured to perform one or more functions for a cell site audit at or near the cell site while the UAV is flying tethered at or near the cell site, utilizing one or more of a camera and wireless interfaces;
- wherein the UAV is stored at or near the cell site in the housing while the UAV is not in use, wherein the housing comprises a door that selectively opens and closes for the UAV, and wherein the housing is one of i) on a cell tower at the cell site and ii) at or part of a shelter or cabinet at the cell site, wherein the one or more functions comprise functions related to a cell site audit which is performed remotely from the cell site with the UAV already located at the cell site, and
- wherein the cell site audit comprises obtaining data remotely via the UAV tethered at or near the cell site, the data comprising a plurality of a down tilt angle of one or more antennas of the cell site components, plumb of the cell tower and/or the one or more antennas, azimuth of the one or more antennas, Global Positioning Satellite (GPS) coordinates, dimension of the cell site components, equipment type and serial number of the cell site components, connections between the cell site components, and status of a lighting rod and warning light on the cell tower.

* * * * *